3,356,593
SEPARATION OF METAXYLENE-PARAXYLENE MIXTURES BY EXTRACTIVE DISTILLATION
Shigeto Suzuki, San Francisco, Calif., assignor to Chevron Research Company, San Francisco, Calif., a corporation of Delaware
No Drawing. Filed Aug. 17, 1965, Ser. No. 480,515
6 Claims. (Cl. 203—29)

ABSTRACT OF THE DISCLOSURE

Mixtures of meta- and para-xylene are separated by an extractive distillation at a temperature below about 110° C. in which the mixture is in contact with a substantially anhydrous solution of silver ion in phosphoric acid, lower alkane sulfonic acid or mixture thereof.

---

This invention relates to the separation of metaxylene from metaxylene-paraxylene mixtures in an extractive distillation process.

In the separation of the $C_8$ aromatic hydrocarbon mixtures only the efficient separation of meta- and paraxylene from each other remains a particular problem in the art. Orthoxylene and ethyl benzene are readily obtainable from the above $C_8$ mixtures by conventional efficient distillations, a means not available for the separation of meta- and paraxylene mixtures because of the close proximity of their boiling points. It is, of course, known to partially separate paraxylene-metaxylene mixtures by the use of fractional crystallization techniques, but there is a substantial portion of unseparated mother liquor which represents a relatively large amount of potential product. One expedient practiced in the art has been to process this mother liquor in an isomerization unit, but this has obvious drawbacks; that is (1) conversions and yields are not quantitative and (2) isomerization plants are costly.

It has now been found that metaxylene-paraxylene hydrocarbon mixtures can be efficiently separated by the use of an extractive distillation technique in which the distillation is carried out having the xylene mixture in contact with a substantially anhydrous concentrated solution of silver ion in phosphoric, lower alkane sulfonic acids or mixtures thereof. As a result of the distillation an overhead portion is obtained which is materially enriched in paraxylene, and an extract portion or bottoms portion is recovered which is substantially enriched in metaxylene. The resulting enriched fractions may be subjected to a series of such fractionations for the recovery of essentially pure meta- and paraxylene or used as feeds for a crystallization process or the like.

By a substantially anhydrous solution of silver ion is meant a solution having a water content of not more than about 15 weight percent. Preferably no water at all should be present in the solution. But as a practical matter small amounts of water of the order of 5 weight percent or less are usually encountered in the commercial solvent acids of the present invention or accumulate therein to some extent during use in the process as from extraneous sources and incompletely dried aromatic hydrocarbon feed stocks.

By a concentrated solution of silver ion is meant a concentration of at least about 5 mol percent. In general, the higher the silver ion concentration, the better is the separation, since it is the differential interaction of the silver ion with the meta- and paraxylene molecules which promotes the separation. A saturated solution, of course, represents the upper concentration limit.

In general, the source of the silver ion is the silver salt of the solvent acid. Thus silver phosphate, and silver salts of the lower alkane sulfonic acids, such as methane, ethane, propane and the like sulfonic acids, are useful sources. The salt per se may be used or prepared in situ as by dissolution of silver oxide. Other soluble silver salts may be used, such as silver fluoborate, silver fluosilicate, silver acetate and the like, as well as such salts in admixture.

Meta- and paraxylene mixtures in general may be used as feeds in the present process. Small amounts, i.e., less than about 10 weight percent, of hydrocarbon impurity of substantially the same boiling point range, i.e., about 135–140° C., may be present without there being a too serious interference with the desired separation. Smaller amounts of feed impurity are, of course, desirable. Substantially higher or lower boiling feed impurities present no particular problem.

In the separations of the present process, distillation temperatures below about 100–110° C. are desirably employed. The interaction of the aromatic hydrocarbon (e.g. metaxylene) and silver ion, upon which the separation appears to be dependent, decreases with increased temperature. The subject separations are therefore necessarily effected at subatmospheric pressures, i.e., of the order of less than about 200–300 millimeters of mercury pressure.

The following table of examples illustrates the utility of the dissolved silver salts as agents for extractive distillation separations of meta- and paraxylene mixtures. The data were obtained using an equilibrium still. The separation efficiency is given by the α-value which is defined as:

$$\frac{(\text{wt. \% paraxylene) distillate}/(\text{wt. \% paraxylene) pot}}{(\text{wt. \% metaxylene) distillate}/(\text{wt. \% metaxylene) pot}}$$

As long as the α-value found for an acid-salt combination is greater than 1.06, and preferably at least 1.1, an effective separation by extractive distillation is possible for the given pair of reagents.

The following examples demonstrate that concentrated solutions of silver ion in phosphoric and lower alkane sulfonic acids are useful as agents for the separation of meta- and paraxylene mixtures in extractive distillations.

TABLE.—EQUILIBRIUM STILL SEPARATION OF META-, PARAXYLENE MIXTURES [a]

| Run No. | Vol. percent Xylene [b] | Solvent | Salt Type | Salt Wt. percent [c] | Pot Temp., °C. [d] | Xylenes Distilled, Vol. percent [e] | $\alpha$-value [f] |
|---|---|---|---|---|---|---|---|
| 1 | 21.1 | MeSO$_3$H | Ag$_2$O | 11.9 | 73 | 21.0 | 1.15 |
| 2 | 21.1 | MeSO$_3$H | Ag$_2$O | 11.9 | 73 | 15.5 | 1.17 |
| 3 | 100.0 | None | | | 64 | 1.0 | 1.06 |
| 4 | 16.7 | MeSO$_3$H | Ag$_2$O | 11.9 | 74 | 9.5 | 1.24 |
| 5 | 11.9 | H$_3$PO$_4$ | Ag$_3$PO$_4$ | 20.4 | 85 | 14.1 | 1.11 |
| 6 | 13.8 | H$_3$PO$_4$ | Ag$_3$PO$_4$ | 16.3 | 72 | 12.5 | 1.17 |
| 7 | 16.7 | EtSO$_3$H | Ag$_2$O | 12.9 | 95 | 9.5 | 1.11 |
| 8 | 16.7 | H$_3$PO$_4$-MeSO$_3$H (3:1) | Ag$_3$PO$_4$ | 17.0 | 74 | 9.5 | 1.12 |
| 9 | 13.8 | H$_3$PO$_4$-MeSO$_3$H (4:1) | Ag$_3$PO$_4$ | 14.0 | 74 | 9.5 | 1.13 |
| 10 | 13.0 | H$_3$PO$_4$-Et$_3$PO$_4$ (3:1) | Ag$_3$PO$_4$ | 14.0 | 72 | 9.5 | 1.20 |
| 11 | 16.7 | MeSO$_3$H | Ag$_2$O | 11.9 | 96 | 8.5 | 1.13 |
| 12 | 11.8 | H$_3$PO$_4$-MeSO$_3$H (3:2) | Ag$_3$PO$_4$ | 14.5 | 91 | 9.8 | 1.14 |

[a] 50 vol. percent each used. Runs 1 and 2 were run in a stationary equilibrium still; Runs 3–12 in a turbo-type equilibrium still.
[b] Initial vol. percent xylenes in solution.
[c] Wt. percent in solvent.
[d] All runs at 50 mm. pressure except Runs 11, 12 (at 100 mm.)
[e] Vol. percent distilled xylenes to total amount of xylenes used.
[f] $\alpha = \dfrac{\text{(Wt. percent paraxylene) distillate}/\text{(wt. percent paraxylene) pot}}{\text{(Wt. percent metaxylene) distillate}/\text{(wt. percent metaxylene) pot}}$ Note: Turbo-type equilibrium still is one in which the flask is a small, stirred turbo-mixer, and the condensate return feeds below the surface of the liquid contents thereof.

I claim:
1. A process for the separation of metaxylene from a mixture of paraxylene and metaxylene, which comprises extractively distilling at a temperature below about 110° C. said mixture in contact with a liquid phase consisting essentially of a substantially anhydrous concentrated solution of silver ion in a solvent selected from the group consisting of phosphoric acid, lower alkane sulfonic acids or their mixtures, thereby producing a distillate portion which is substantially enriched in paraxylene and an extract portion which is substantially enriched in metaxylene.

2. The process of claim 1 wherein said silver ion solvent acid is phosphoric acid.

3. The process of claim 1 wherein said silver ion solvent acid is a lower alkane sulfonic acid.

4. The process of claim 1 wherein said mixture is a metaxylene-paraxylene crystallization mother liquor.

5. The process of claim 1 wherein said silver ion solvent acid is methane sulfonic acid.

6. The process of claim 1 wherein said silver ion solvent acid is ethane sulfonic acid.

References Cited

UNITED STATES PATENTS

| 2,363,309 | 11/1944 | Friedman et al. | 260—674 |
| 2,567,228 | 9/1951 | Morrell et al. | 260—674 |
| 2,768,986 | 10/1956 | Johnson et al. | 260—674 |
| 3,272,723 | 9/1966 | Fannin | 260—674 |

DELBERT E. GANTZ, *Primary Examiner.*

C. E. SPRESSER, *Assistant Examiner.*